(12) United States Patent
Bryce

(10) Patent No.: US 6,331,007 B1
(45) Date of Patent: Dec. 18, 2001

(54) SPORTING EQUIPMENT BINDING APPARATUS

(75) Inventor: Jonathan Bryce, Cottage Point (AU)

(73) Assignee: Griplock Pty Ltd. (AU)

( * ) Notice: Subject to any disclaimer, the term of this patent is extended or adjusted under 35 U.S.C. 154(b) by 0 days.

(21) Appl. No.: 09/194,730

(22) PCT Filed: Jun. 13, 1997

(86) PCT No.: PCT/AU97/00375

§ 371 Date: Dec. 2, 1998

§ 102(e) Date: Dec. 2, 1998

(87) PCT Pub. No.: WO97/48301

PCT Pub. Date: Dec. 24, 1997

(30) Foreign Application Priority Data

Jun. 14, 1996 (AU) .................................................. P00432

(51) Int. Cl.[7] .................................................. A63C 1/99
(52) U.S. Cl. .................... 280/11.3; 280/626; 280/629; 280/634
(58) Field of Search .................... 280/613, 617, 280/623, 625, 626, 629, 630, 87.01, 87.021, 87.041, 87.042, 634, 636, 11.3, 14.2

(56) References Cited

U.S. PATENT DOCUMENTS

| 3,902,729 | 9/1975 | Druss ........................ 280/11.35 R |
| 4,185,851 | 1/1980 | Salomon ........................ 280/613 |
| 4,278,269 | 7/1981 | Beyl ........................ 280/613 |
| 4,298,210 | 11/1981 | Lotteau et al. ........................ 280/259 |
| 4,361,344 | 11/1982 | Hull et al. ........................ 280/12 H |
| 4,403,785 | 9/1983 | Hottel ........................ 280/613 |
| 4,653,203 | 3/1987 | DeMatthesis ........................ 36/117 |
| 4,728,115 | 3/1988 | Pozzobon et al. ........................ 280/613 |
| 4,739,564 | 4/1988 | Eser ........................ 36/131 |
| 4,792,156 | 12/1988 | Hue ........................ 280/615 |

(List continued on next page.)

FOREIGN PATENT DOCUMENTS

| 89878/82 | 10/1983 | (AU) . |
| 33890/84 | 10/1984 | (AU) . |
| 2 623 464 | 5/1989 | (FR) . |
| WO 87/07119 | 12/1987 | (WO) . |
| WO 87/07120 | 12/1987 | (WO) . |

Primary Examiner—J. J. Swann
Assistant Examiner—L. Lum
(74) Attorney, Agent, or Firm—Akerman Senterfitt

(57) ABSTRACT

Binding apparatus for use with an item of sports equipment such as a skate board, the binding apparatus including a first part adapted for attachment to an article of footwear and a second part adapted for attachment to the item of sports equipment. One of the first and second parts includes a protuberance and the other of the first and second parts includes a recess adapted to receive the protuberance therein. The first and second parts also have complementary securing parts for releasably securing the protuberance in the recess. The securing parts are adapted to secure the protuberance in the recess upon the protuberance reaching therein a predetermined engagement. The release of the first part from the second part is allowed exclusively upon application of an upwardly directed breakaway force.

18 Claims, 7 Drawing Sheets

U.S. PATENT DOCUMENTS

| | | | |
|---|---|---|---|
| 4,803,894 | 2/1989 | Howell | 74/594.6 |
| 4,815,333 | 3/1989 | Sampson | 74/594.6 |
| 4,928,982 | 5/1990 | Logan | 280/11.22 |
| 4,936,164 | 6/1990 | Forké | 74/594.6 |
| 4,942,778 | 7/1990 | Bryne | 74/594.6 |
| 5,044,654 | 9/1991 | Meyer | 280/613 |
| 5,054,807 | 10/1991 | Fauvet | 280/607 |
| 5,213,009 | 5/1993 | Bryne | 74/594.6 |
| 5,236,216 | 8/1993 | Ratzek | 280/607 |
| 5,251,508 | 10/1993 | Robbins | 74/594.6 |
| 5,269,200 | 12/1993 | Hawkins | 74/594.6 |
| 5,325,738 | 7/1994 | Bryne | 74/594.6 |
| 5,435,080 | 7/1995 | Meiselman | 36/117 |
| 5,473,963 | 12/1995 | Aeschbach | 74/594.6 |
| 5,520,405 | 5/1996 | Bourke | 280/613 |
| 5,553,516 | 9/1996 | Weiss | 74/594.6 |
| 5,641,172 | 6/1997 | Hoffman et al. | 280/87.042 |
| 5,667,237 * | 9/1997 | Lauer | 280/607 |
| 5,681,054 * | 10/1997 | Bonvallet | 280/602 |
| 5,692,323 | 12/1997 | Goldberg | 36/134 |
| 5,852,955 | 12/1998 | Crisick et al. | 74/594.6 |
| 5,971,421 * | 10/1999 | Hilgarth | 280/613 |

* cited by examiner

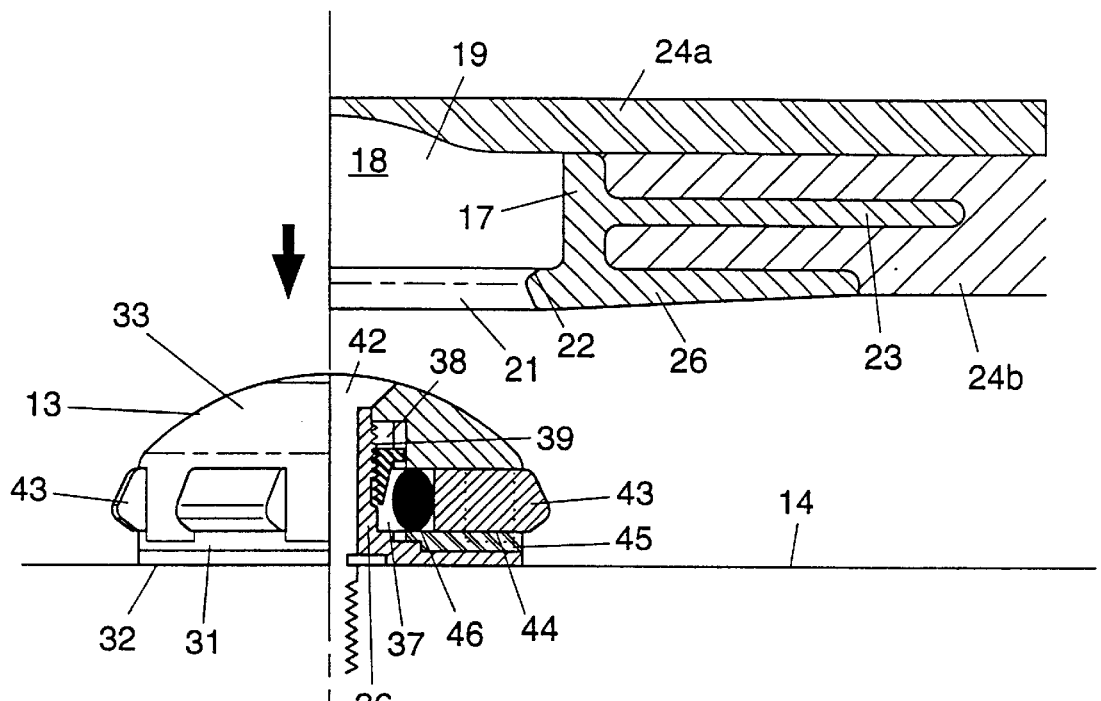
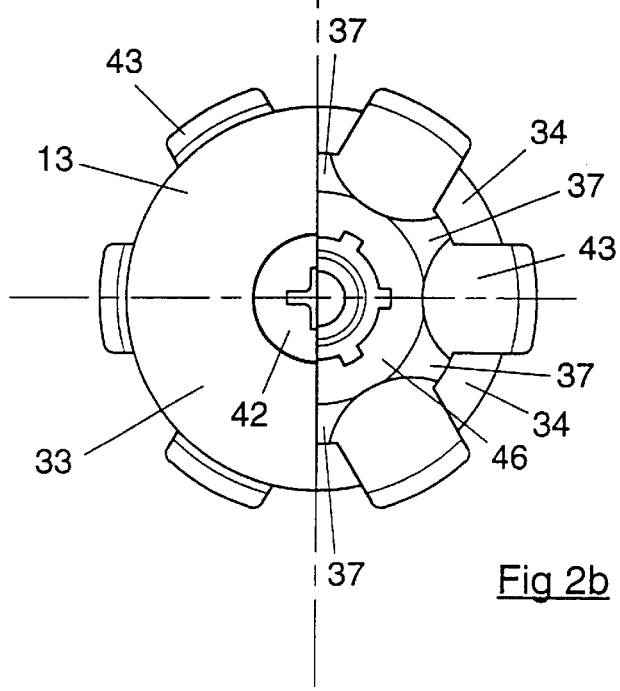

SPORTING EQUIPMENT BINDING APPARATUS

TECHNICAL FIELD OF THE INVENTION

This invention relates to binding apparatus and has particular application to binding apparatus for use with items of sports equipment such as skateboards and surfboards where advantage can be gained from being releasably secured to the item of sports equipment and for illustrative purposes reference will be made to such applications. However it is to be understood that the invention could have application with other items of sports equipment such as bicycles.

BACKGROUND ART

The desirability of a user being releasably attached to an item of sports equipment has been recognised for some time as evidenced by Australian Patent Specification No. 33890/84 by Hamilton. The Hamilton specification describes apparatus for use with a surfboard, including complementary layers of interlocking hook and loop fasteners of the type known as "VELCRO" attached to the board rider's boots and the surfboard respectively. However, it appears that such apparatus would not easily allow correct alignment of the board rider's boots with the board at a predetermined desirable position. Furthermore, the apparatus does not provide the rider with the opportunity to pivot his feet whilst riding the board and additionally the breakaway force required to be applied by the rider to release himself from the board cannot be varied.

The use of binding apparatus with snow boards and snow skis is well known but such apparatus is not suitable for use with other items of sports equipment particularly skateboards as the rider cannot quickly and easily engage and disengage his boots with or from the board such as is necessary with skateboards. Similar circumstances exist with surfboards.

It is an object of the present invention to provide binding apparatus for use with an item of sports equipment such as a skateboard or surfboard whereby the item of sports equipment may be selectively secured to and released from the persons footwear as desired,. It is another object to provide binding apparatus which allows the rider to relatively easily secure his footwear to the item of sports equipment in a predetermined position. It is yet another object to provide binding apparatus in which the user of the sports equipment can release himself from the sports equipment upon application of a predetermined breakaway force.

DISCLOSURE OF THE INVENTION

With the foregoing and other objects in view, the invention in one aspect resides broadly in binding apparatus for use with an item of sports equipment such as a skate board, the binding apparatus including a first part adapted for attachment to an article of footwear and a second part adapted for attachment to the item of sports equipment, one of said first part and said second part including a protuberance and the other of said first part and said second part including a recess adapted to receive therein said protuberance, the first and second parts also having complementary securing means for releasably securing said protuberance in said recess, said securing means being adapted to secure said protuberance in said recess upon said protuberance reaching therein a predetermined engagement. It is to be understood that the terms 'adapted for attachment to an article of footwear" and "adapted for attachment to the item of sports equipment" include articles of footwear and items of equipment in which the first part and second part are integrally provided respectively.

Preferably, the second part includes the protuberance and the first part includes the recess. It is also preferred that the first part be adapted for attachment to the sole of a boot or shoe where the recess is located immediately below the ball of the wearers foot. Advantageously, such arrangement allows the footwear to be worn separately without discomfort to the wearer and thus a board rider can carry the board whilst wearing the footwear or in the case of use of the apparatus with a skateboard the rider can use one foot for pushing off without discomfort. Furthermore, such positioning of the recess allows the user effective control of the item of sports equipment. However, in other applications, the recess may be provided in a different part of the sole of the boot or shoe.

Preferably, the securing means are so made and arranged that the protuberance can be pushed directly into the recess without sideways pivoting movement of the first part relative to the second part. It is also preferred that the securing means allow release of the first part from the second part upon application of a predetermined breakaway force and preferably said securing means includes adjustment means for adjusting the predetermined breakaway force. In a preferred form the securing means includes a plurality of tongue members slidably mounted in the protuberance for sideways movement relative thereto and adapted to engage with a lip or flange provided in the recess. In such form of the invention it is preferred that each tongue member be tapered at its engaging end on one side to provide a lead in portion to assist engagement with the lip or flange and if desired the tongue member may be tapered on the opposite side to provide a lead out for easier breakaway. Suitably, the shape and angle of the respective tapers is selected for a predetermined required force so that a selected group of users of the apparatus will be able to achieve engagement of the protuberance in the recess and similarly so that breakaway can be achieved upon application of a predetermined breakaway force. The term "sideways movements" and similar terms such as "sideways pivoting movement" mean movement in a direction generally sideways of a persons trunk when that person is wearing the article of footwear.

Preferably, said first and second parts are so made and arranged that in use sideways pivoting movement of the article of footwear is allowed wherein it will be seen that the invention can be effectively utilised with items of sports equipment such as skateboards and/or surfboards where a rider may wish to pivot his feet across the upper surface of the board about the protuberance to a particular desired position. In one such form of the invention, the protuberance and the recess are circular when viewed from above or below, the protuberance being a neat fit in the recess so as to allow pivoting therein.

Preferably the protuberance is shaped to assist in alignment of the protuberance with the recess and for this purpose has a lead-in portion. In a preferred form the protuberance is a dome shaped knob which achieves this purpose.

BRIEF DESCRIPTION OF THE DRAWINGS

In order that the invention may be more clearly understood and put into practical effect, reference will now be made to accompanying drawings which illustrate preferred embodiment so of the invention and wherein:

FIG. 2a is a cross-sectional side elevation of the apparatus of FIG. 1 with the first part in line for assembly with the second part;

FIG. 2b is a plan view of the first part as shown in FIG. 2a;

FIG. 2c is a cross-sectional side elevation of modified apparatus shown in the same position as that of FIG. 2a;

FIG. 3b is a plan view of the second part in the disposition illustrated in FIG. 3a;

FIG. 4b is a plan view of the second part in the disposition illustrated in FIG. 4a;

FIG. 5b is a plan view of the second part in the disposition illustrated in FIG. 5a.

DETAILED DESCRIPTION OF THE DRAWINGS

Figure 1:
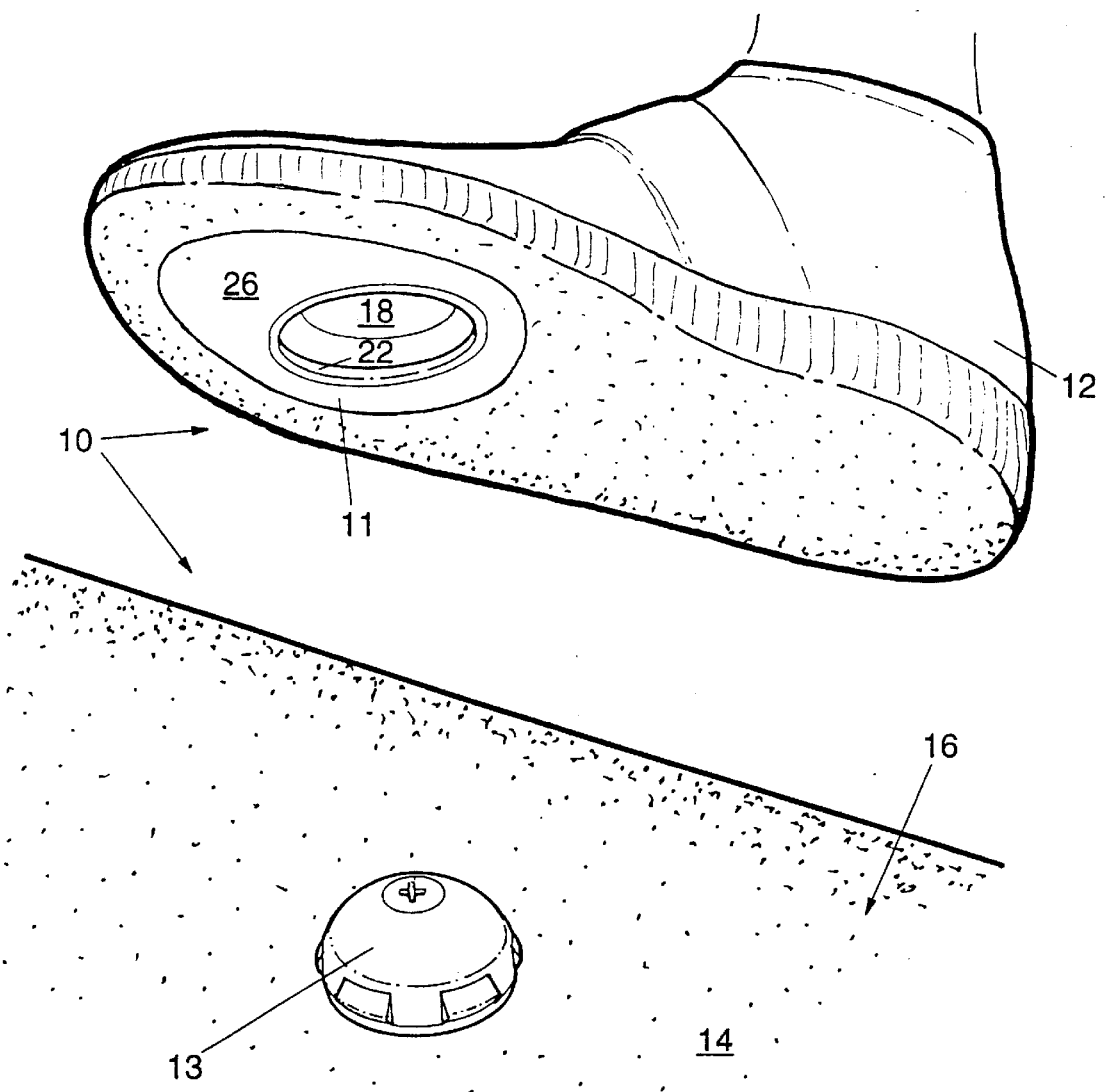
FIG. 1 is a pictorial representation of binding apparatus according to the invention in use with a skateboard, with a first part being mounted in the sole of a shoe and a second part being screwed to the skateboard.

The binding apparatus 10 illustrated in the drawings includes a housing 11 constituting a first part of the apparatus secured within the outer sole of a shoe 12 immediately beneath the ball of a wearers foot and a dome shaped knob 13 constituting a second, part of the apparatus secured to the upper face of the platform 14 of a skateboard 16, the knob being adapted to cooperate with the housing so as to connect the skateboard to the shoe. The terms upper and lower as used herein are to be understood as being referenced to the normal standing position of a person wearing the shoe 12.

Figure 2C:
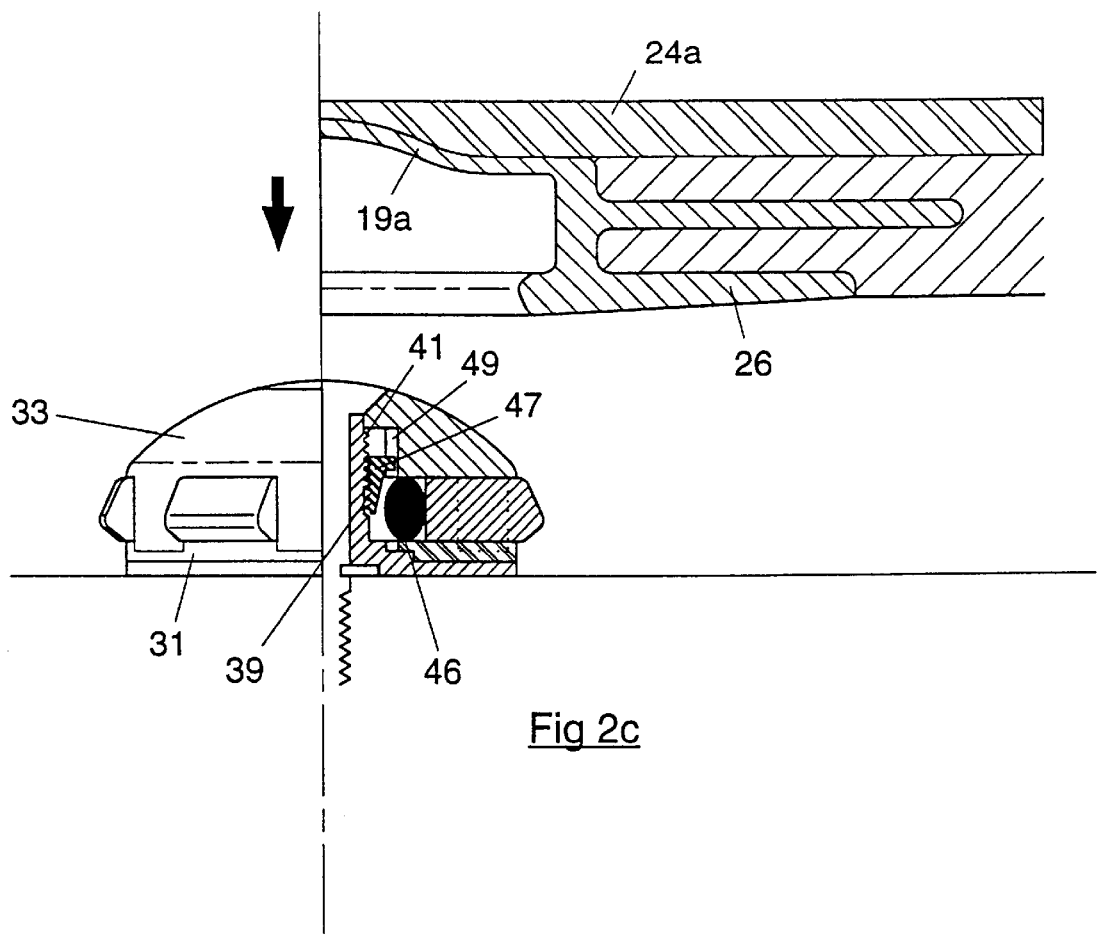
Figure 3A:
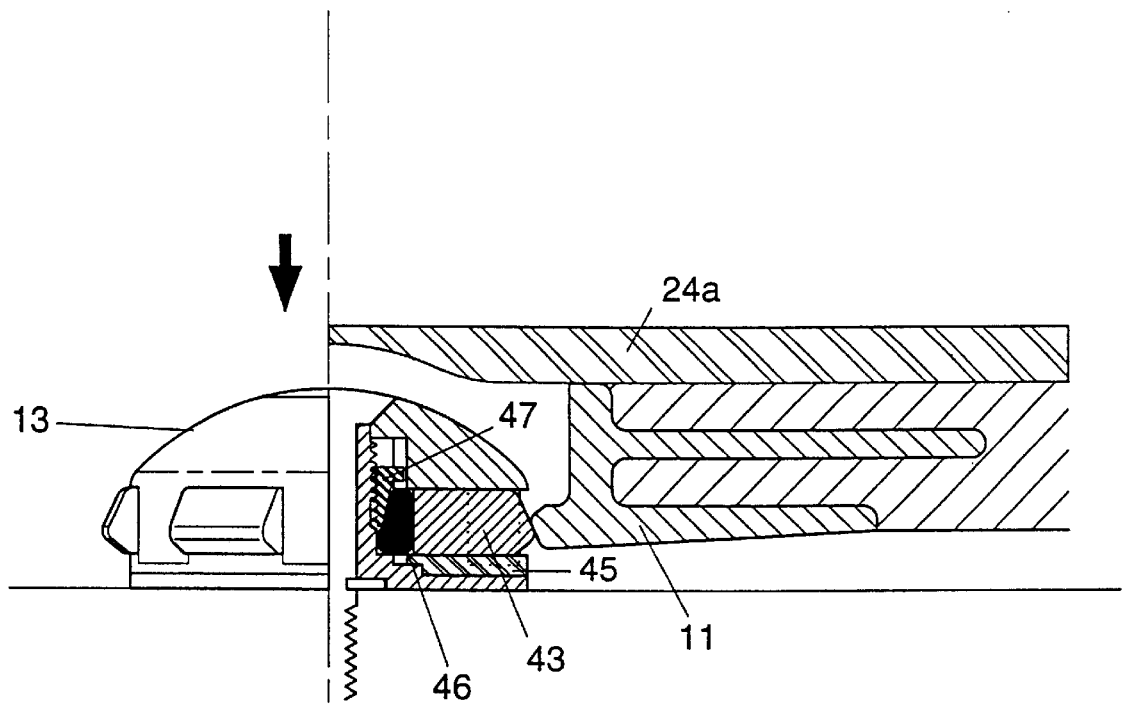
FIG. 3a is a further illustration of the apparatus of FIG. 1 with the first part being partly engaged with the second part.
Figure 3B:
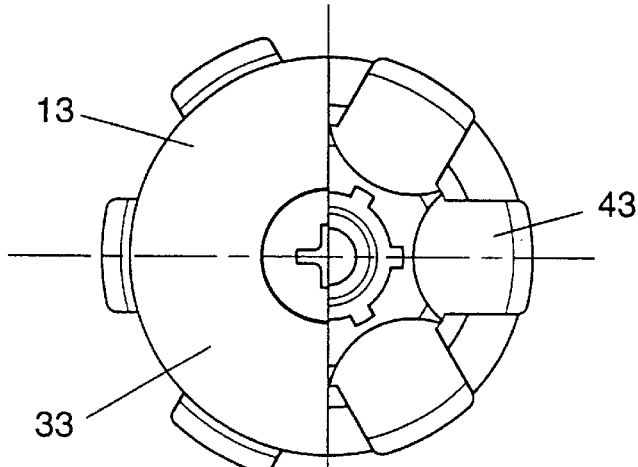
Figure 4A:
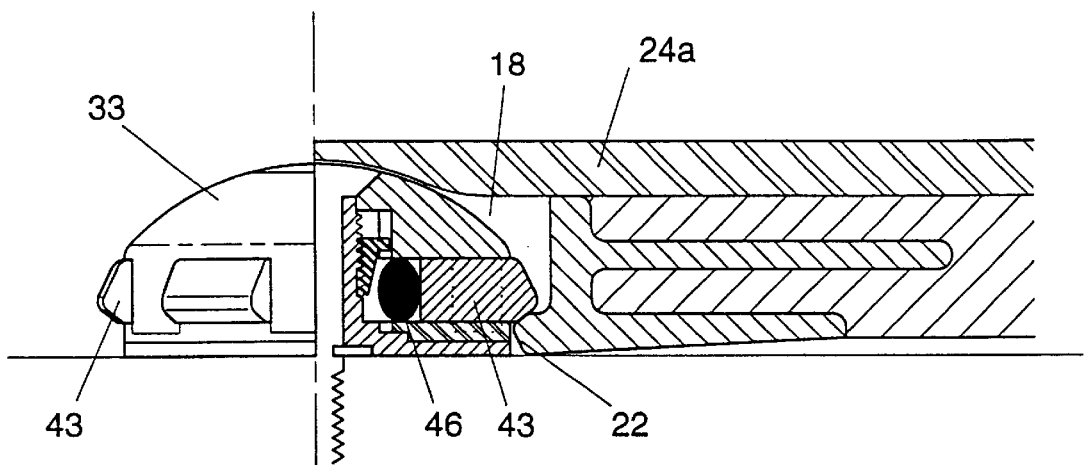
FIG. 4a is a further illustration of the apparatus showing the first part fully engaged about the second part.
Figure 4B:
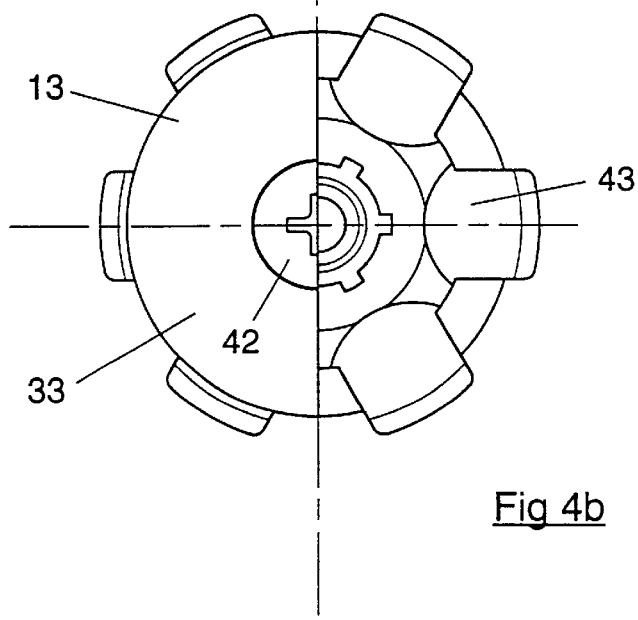
Figure 5A:
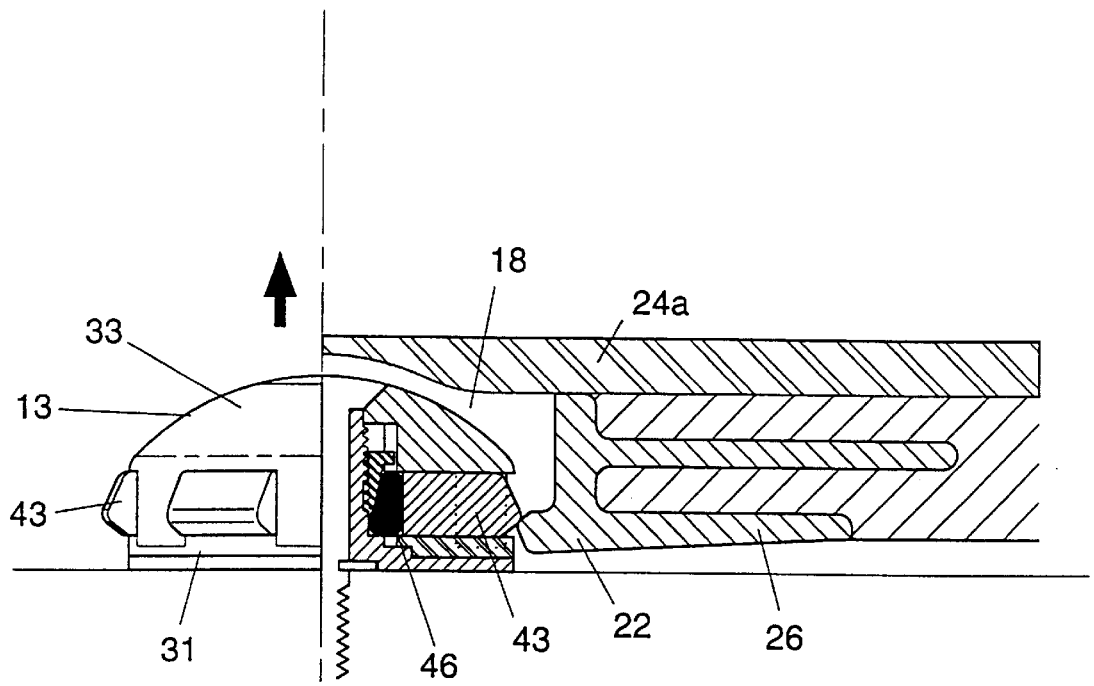
FIG. 5a is a further illustration showing the first part partly removed from the second part.
Figure 5B:
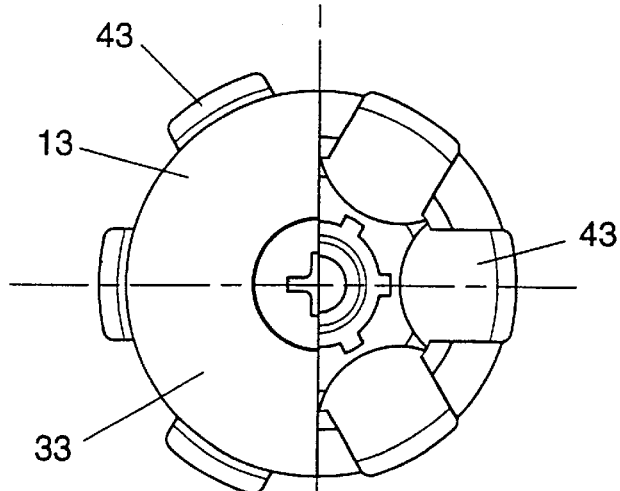
Figure 6:
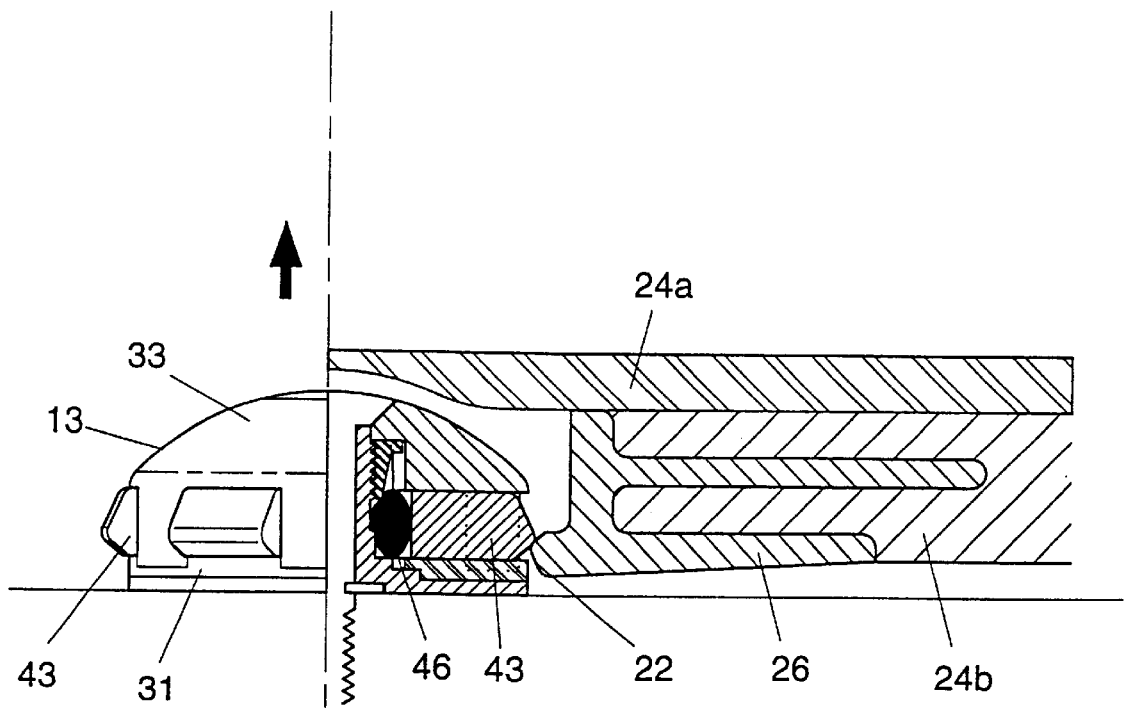
FIGS. 6 and 7 illustrate the adjustment mechanism of the binding apparatus of FIG. 1.
Figure 7:
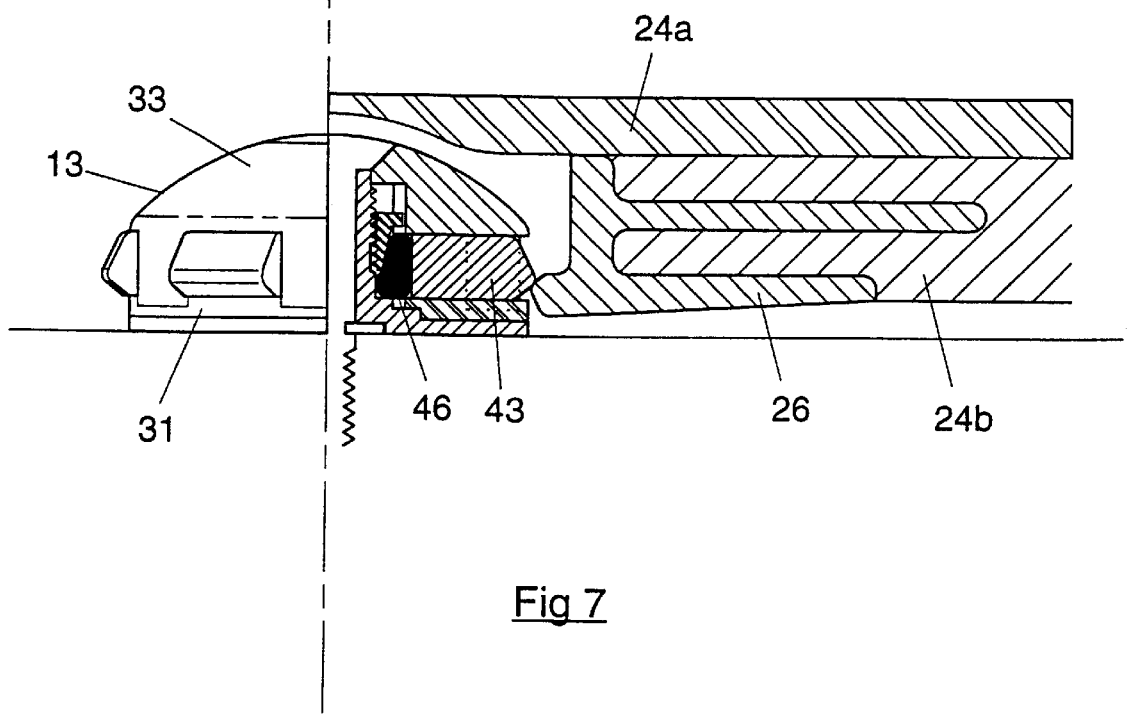

The housing 11 comprises a substantially cylindrical wall portion 17 generally perpendicular to the sole of the shoe and defining a recess or hollow 18 having an upper opening 19 and a lower opening 21 defined by an inner lip or flange 22 formed within the wall portion to define an entry to the recess for receiving therethrough the knob 13 as illustrated in FIG. 2a. In this embodiment the opening 19 is covered by the inner sole 24a. However, FIG. 2c illustrates a slightly modified housing 11a having an upper end wall portion 19a rather than the upper opening 19 the purpose of which will become apparent later with the inner sole covering the upper wall portion.

In the embodiments illustrated, the housing 11 is moulded from a fairly rigid plastics material and includes an intermediate flange portion 23 extending sidewardly from the wall portion 17 and generally perpendicular thereto for providing an anchor about which the outer sole 24b of the shoe 12 is moulded to secure the housing therein. A second flange portion 26 extends outwardly from the periphery of the wall portion substantially in line with the lip 21 and parallel to the intermediate flange portion to provide an additional anchor within the outer sole.

The knob 13 has a substantially cylindrical base member 31 having a planar lower face 32 which rests on the upper surface of the platform 14 and a domed upper member 33 adjustably secured to the base member as will now be described. The base member includes a cylindrical outer wall portion 34 spaced from a centrally located upstanding column portion 36 by an annular space 37 and the upper member has a central bore 38 into which the column portion extends for rotation therein. The base member is secured to the platform of the skateboard by a screw 42 located on the axis of the base member and extending fully through the column portion and accessible from the upper face of the domed upper member. Additionally, the head of the screw is located in a round countersunk hole in the upper face of the upper member thereby rotatably securing the upper member to the base member. It will be seen that the diameter of the base member 31 is slightly less than the diameter of the lower opening 21 so that the it can fit easily therethrough for engagement in the recess 18.

Six equi-spaced tongue members 43 are mounted in radially extending apertures 44 provided in the wall portion 34 of the base member for sliding movement into and out of engagement with the lip 22 to selectively secure the knob in the recess 37. The apertures 44 extend fully through the wall portion opening into the annular recess 37 in which a rubber O-ring 46 is located extending fully about the column portion 36. Additionally, base washers 45 are fitted to the apertures for providing a smooth bearing surface for the tongue members. The inner ends of the tongues are in abutting engagement with the outer face of the O-ring which is effective to bias the tongues radially outwards. It will be seen that the O-ring will allow sufficient radial movement of the tongues inwards of the base member (towards its axis) to allow the knob to pass through the opening 21 and engage in the recess 18 and also to allow release of the knob upon a predetermined breakaway force being applied such as when the skateboard rider wishes to release his foot from the board.

A tapered collar 47 threadedly mounted on the column portion 36 via complementary internal and external threads 39 and 41 formed on the collar and the column portion 36 respectively and is adapted to engage with the inner face of the O-ring, the taper being arranged to enlarge the O-ring as it engages further therewith wherein the biassing force applied to the tongues by the o-ring can be increased or decreased. The collar 47 is keyed to the upper member by a key and slot arrangement 49 for rotation therewith so that adjustment of the biassing force can be achieved simply by rotation of the upper member causing the collar to move up or down along the threaded column portion.

In use, either one or two of the knobs 13 are secured to the platform of a skateboard in a predetermined desired position by screws 42 respectively. A rider wearing either one or a pair of shoes 12 can then fit one foot to the front knob and push off with the other foot whereupon he may wish to secure the second foot to the skateboard by the second knob. In such an arrangement, the skateboard rider would be able to perform various tricks, for example jumps, in which the skateboard would travel through the air with him more or less becoming a part of his body.

The rider would be able to release his foot or feet from the skateboard by exerting an upwardly directed breakaway force with one foot whilst holding the skateboard down with the other foot so that the lip 22 would cause the tongues 43 to slide towards the centre of the knob and out of securing engagement with the lip 22. It will be appreciated that some pivoting or rocking movement coincidentally with application of the breakaway force may assist in releasing the housing 11 from the knob 13. Such rocking movement may include rocking forwards and backwards and/or side to side.

Pivoting movement of the shoe 12 relative to the skateboard is allowed in the embodiments illustrated particularly in the one shown in FIG. 2c wherein the upper end wall portion 19a is adapted to rest on the upper surface of the domed upper member 33. On the other hand in the embodiment illustrated in FIG. 2a the weight of the rider is transferred to the platform 14 by the lower face of the flange 26.

The manner in which the collar 47 and O-ring 46 effect adjustment of the biassing force is illustrated in the various drawings some of which show the collar in different amounts of engagement with the O-ring whereupon the amount of compression applied to the O-ring upon a breakaway force being applied can be increased or decreased as desired. It will also be seen that the amount of each taper on the doubly tapered ends of the tongue members can be selected in manufacture to a predetermined ratio of breakaway force to fitting or securing force.

It will be appreciated that in the embodiments illustrated the housing 12 is integrally moulded into the sole of the shoe 12, but in other; embodiments the housing 12 may be made and arranged so that it may be fitted to shoes presently available by screws, rivets or adhesive or the like. Furthermore the knob 13 could be secured to various items of sports equipment by means other than the screw 42, for example by adhesive.

It will of course be realised that while the foregoing invention has been described generally in relation to items of sports equipment, it has other applications where a person may wish to have his feet releasably secured to a platform or other foundation such as in construction or factory applications. Accordingly, the description has been given by way of illustrative example of the invention only and all such and other modifications and variations thereto as would be apparent to persons skilled in the art are deemed to fall within the broad scope and ambit of this invention as is herein set forth.

What is claimed is:

1. A binding apparatus for use with an item of sports equipment, the binding apparatus including a first part adapted for attachment to an article of footwear and a second part adapted for attachment to the item of sports equipment, one of said first part and said second part including a recess and the other of said first part and said second part including a protuberance adapted to be pivotally received in said recess, said first and second parts having complementary securing means for releasably securing said protuberance in said recess upon said protuberance reaching therein a predetermined engagement, said securing means being adapted, in use, to allow release of said first part from said second part exclusively upon application of an upwardly directed breakaway force, wherein said securing means is adapted to releasably secure said protuberance in said recess for sideways pivoting movement of said article of footwear relative to said item of sports equipment.

2. The binding apparatus according to claim 1, wherein said protuberance is included in said second part and said recess is included in said first part said first part being adapted for attachment to a sole of the article of footwear.

3. The binding apparatus according to claim 2, wherein said protuberance and said recess are generally circular in cross-section from above and below, respectively.

4. The binding apparatus according to claim 3, wherein said protuberance has a domed upper end portion for guiding said protuberance into said recess.

5. The binding apparatus according to claim 4, wherein said first part is a housing mounted in or adapted to be mounted in the sole of an article of footwear and said second part is a knob adapted to be secured to the item of sports equipment.

6. The binding apparatus according to claim 1, wherein said securing means is configured so that said protuberance can be pushed directly into the recess without sideways pivoting movement of said first part relative to said second part.

7. The binding apparatus according to claim 6, wherein said securing means includes adjustment means for adjusting the predetermined breakaway force.

8. The binding apparatus according to claim 5, wherein said housing comprises a substantially cylindrical wall portion generally perpendicular to the sole of the article of footwear defining a recess or hollow having a lower opening defined by an inner lip formed within the wall portion and which defines an entry to said recess for receiving therethrough said knob.

9. The binding apparatus according to claim 8, wherein said knob has a substantially cylindrical base member adapted for mounting to the item of sports equipment and a domed upper member secured to the base member.

10. The binding apparatus according to claim 9, wherein said base member includes a cylindrical outer wall portion separated from a centrally located upstanding column portion by an annular space.

11. The binding apparatus according to claim 10, wherein said securing means includes a plurality of tongue members mounted in corresponding radially extending apertures provided in said wall portion for sliding movement into and out of engagement with said lip to selectively secure said knob in said recess.

12. The binding apparatus according to claim 11, wherein said tongue members are biased into securing engagement with said lip by biasing means in said knob.

13. The binding apparatus according to claim 12, wherein said biasing means is an O-ring supported in said annular space.

14. The binding apparatus according to claim 13, further including adjustment means for adjusting a biasing force applied to said tongue members.

15. The binding apparatus according to claim 14, wherein said O-ring has an inner face and an outer face and said adjustment means includes a tapered collar adapted to engage with said inner face, said tapered collar being arranged to enlarge said O-ring as engagement therewith is increased.

16. The binding apparatus according to claim 15, wherein said tapered collar is in threaded engagement with said central column portion and keyed to said upper member for rotation therewith wherein engagement of said tapered collar with said O-ring is achieved by rotation of said upper member.

17. A binding apparatus for use with an item of sports equipment, the binding apparatus including a first part adapted for attachment to an article of footwear and a second part adapted for attachment to the item of sports equipment, one of said first part and said second part including a recess and the other of said first part and said second part including a protuberance adapted to be pivotally received in said recess, said first and second parts having complementary securing means for releasably securing said protuberance in said recess upon said protuberance reaching therein a predetermined engagement, said securing means being adapted to allow release of said first part from said second part exclusively upon application of an upwardly directed breakaway force, wherein said first part is a housing mounted or adapted to be mounted in the sole of an article of footwear and said second part is a knob adapted to be secured to the item of sports equipment and wherein said housing comprises a substantially cylindrical wall portion generally perpendicular to the sole of the article of footwear defining a recess or hollow having a lower opening defined by an inner lip formed within the wall portion and which defines an entry to said recess for receiving therethrough said knob.

18. A binding apparatus for use with an item of sports equipment, the binding apparatus including a first part adapted for attachment to an article of footwear and a second part adapted for attachment to the item of sports equipment, one of said first part and said second part including a recess and the other of said first part and said second part including a protuberance adapted to be pivotally received in said recess, said first and second parts having complementary securing means for releasably securing said protuberance in said recess upon said protuberance reaching therein a predetermined engagement, and being adapted to releasably secure said protuberance in said recess for sideways pivoting movement of said article of footwear relative to said item of sports equipment, said recess having an opening defined by an inner lip and said protuberance having a plurality of tongues adapted to move from an extended position in which said tongues engage with said inner lip to secure said protuberance in said recess and a retracted position in which said protuberance is released from said recess, and said inner lip being adapted to move said tongues from said extended position to said retracted position upon application of a predetermined, exclusively upwardly directed breakaway force.

* * * * *